United States Patent
Catanese et al.

(10) Patent No.: US 7,844,900 B2
(45) Date of Patent: Nov. 30, 2010

(54) VISUAL MANAGEMENT SYSTEM

(76) Inventors: Joseph P. Catanese, 1384 Huntington Rd., Stratford, CT (US) 06614; Paul Delano, 501 Westport Ave., #252, Norwalk, CT (US) 06851

(*) Notice: Subject to any disclaimer, the term of this patent is extended or adjusted under 35 U.S.C. 154(b) by 1663 days.

(21) Appl. No.: 10/861,237

(22) Filed: Jun. 4, 2004

(65) Prior Publication Data
US 2005/0007501 A1    Jan. 13, 2005

Related U.S. Application Data

(63) Continuation-in-part of application No. 10/357,565, filed on Feb. 5, 2003, now abandoned.

(51) Int. Cl.
*G06F 3/00* (2006.01)
(52) U.S. Cl. ........................ 715/716; 715/788
(58) Field of Classification Search ............... 715/716
See application file for complete search history.

(56) References Cited

U.S. PATENT DOCUMENTS 5,390,501 A * 2/1995 Davis et al. .................... 62/59
7,010,755 B2 * 3/2006 Anderson et al. ............ 715/778
2002/0191028 A1 * 12/2002 Senechalle et al. .......... 345/800

* cited by examiner

*Primary Examiner*—Ryan F Pitaro
(74) *Attorney, Agent, or Firm*—Alfred M. Walker; John F. Vodopia

(57) ABSTRACT

A process for dividing an electronic screen, such as a television or computer screen, into discrete, independently operating sub-screens includes the step of electronically linking the screen to a screen operating system. This operating system is capable of selectively dividing the screen into two or more sub-screens which support audio or visual data in an active mode simultaneously and independently. This is performed through the use of a plurality of data access lines which provide data simultaneously to the two or more sub-screens such that the data can be simultaneously accessed and manipulated in more than one sub-screen such that each sub-screen actively supports data generated from a dedicated software program. Such invention may be implemented in customized encoded hardware or a combination of hardware and software.

17 Claims, 6 Drawing Sheets

VISUAL MANAGEMENT SYSTEM

CLAIM OF PRIORITY

This patent application claims priority from non-provisional patent application, Ser. No. 10/357,565 with a filing date of Feb. 5, 2003 now abandoned. This application is a continuation in part of the Ser. No. 10/357,565 non-provisional application.

BACKGROUND OF THE INVENTION

The present invention generally relates to electronic screens, such as those used in television sets and computer monitors. More particularly, the present invention resides in a process for dividing such electronic screens into discrete, independently operating sub-screens which can be simultaneously manipulated and accessed.

In the past, electronic screens, such as those used for televisions and computers, have only supported a single active window or screen at a time. For example, even televisions with picture-in-picture capabilities have only one active screen which can be manipulated at any given time. Similarly, in computer monitor systems, although the computer monitor screen may show a plurality of windows at any given time, only one window is active. There are instances when the computer screen can be divided into two screens, but the contents of the two windows are controlled by the same software, for example, a word processing function allowing two separate windows to be created to view two documents. However, only one of the documents can be accessed and manipulated at any given time, even in this scenario.

Accordingly, there is a need for a screen operating system which divides an electronic screen into discrete, independently operating sub-screens which are independently fed data and can be manipulated through discrete access lines. The present invention fulfills these needs and provides other related advantages.

SUMMARY OF THE INVENTION

The present invention resides in a process for dividing an electronic screen into discrete, independently operating sub-screens and as such provides split-screen technology where the additional screen sub-screens do not override the content of the other locations or sub-screens depending on user preference. This is performed by providing an electronic screen, such as a computer or television screen. In one embodiment, the screen is at least a twenty inch screen.

The screen is electronically linked to a screen operating system capable of selectively dividing the screen into two or more sub-screens with support visual and/or audio data therein in an active mode simultaneously and independently. This is done by creating a plurality of data access lines which provide data simultaneously to the two or more sub-screens. The data in the more than one sub-screen can be simultaneously accessed and manipulated through the screen operating system. Thus, each sub-screen actively supports data generated from a dedicated software program. Of course, it will be appreciated by those skilled in the art that the data can comprise visual or audio data.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
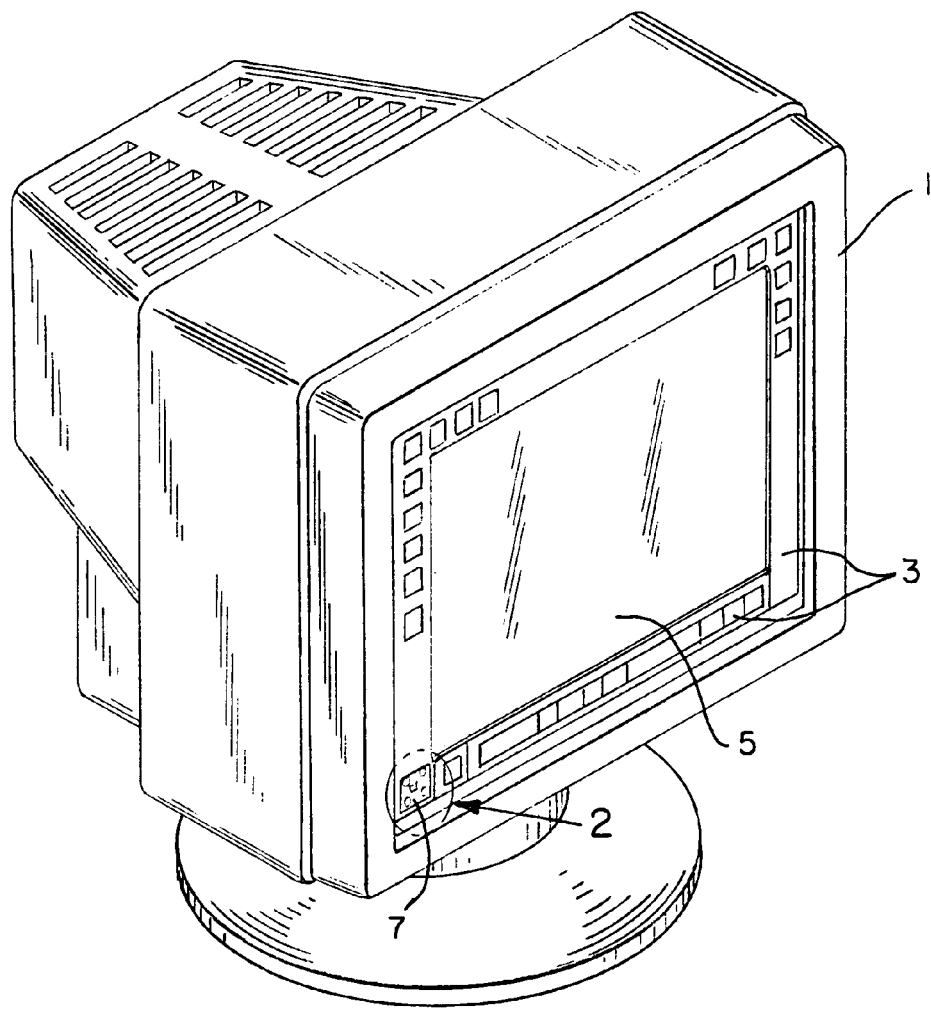
FIG. 1 is a diagrammatic view of an electronic screen divided into multiple operating sub-screens in accordance with the present inventions.

As illustrated in FIG. 1, the present invention resides in an electronic screen 1, such as a computer screen, television screen, or any other electronic screen. In one embodiment, the electronic screen 1 is a television screen having a dimension of at least twenty inches. The screen 1 is electronically linked to a screen operating system which is capable of selectively dividing the screen 1 into two or more sub-screens 3 with support visual and/or audio data therein in an active mode simultaneously and independently.

This is done by creating a plurality of data access lines through which the data is transmitted to the two or more sub-screens 3. For example, illustrated sub-screen 5 comprises a main screen, such as the screen which would initially appear upon turning on the television. Using the screen operating system, and possibly key strokes or icon based commands, the screen operating system could be manipulated so as to provide a secondary screen illustrated as sub-screen 3, which could have other information, such as closed caption writing. Yet another sub-screen, such as that illustrated as sub-screen 3, could be made in order to support additional information, such as a ticker tape or financial market news. The main viewing screen 5 could be physically one screen, but electronically split into multiple screens such that the content of each screen does not permanently override the other unless the user so designates it. Preferably, the user can selectively enlarge or reduce the size of each screen 3.

Figure 2:
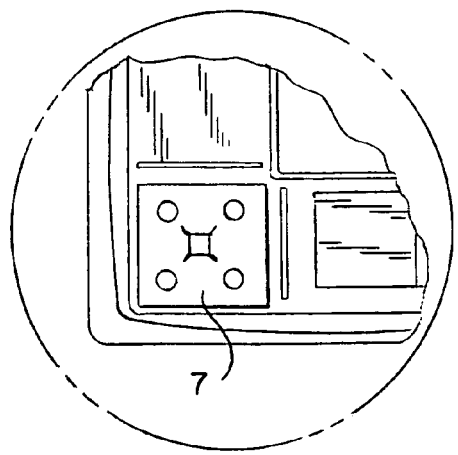
FIG. 2 is the blow up view of sub-screen with manipulability.

Also, in the particular embodiment, the data in each sub-screen can be simultaneously accessed and manipulated through the screen operating system. Thus, each sub-screen 3 actively supports data generated from a dedicated software program. In this regard, are active stock ticker tape symbol screen, such as that illustrated in screen 7, could be actively updated while the user viewed a television program or conducted data processing using a data processing software program as shown in FIG. 2.

Additional sub-screens do not override the content of the other sub-5 screens. The data that is placed within them, icons, pictures, excel file numbers, electronic TV guide, screen saver pictures, etc. is irrelevant just as the software used to write it whether it be Windows based, Linux based, or Mac based.

In fact, it is contemplated that the World Wide Web could be navigated while another sub-screen supports another function. For example, while writing a report, a word processing program could support an individual screen while the other sub-screen supported the navigation of the World Wide Web. Searches could be conducted in the World Wide Web screen while data would be manipulated in the other screen.

One of the sub-screens could be used to support a sound system, such as a home theater sound system using icons or the like, while viewing another screen or manipulating data in yet another screen. The sub-screens can be reconfigured so that they support different programs or have different data imported therein. As mentioned above, the user should be able to have the means to alter the size of the screen so that a particular sub-screen can be enlarged while others are reduced, yet still visible or operating.

The present invention will essentially define the convergence of a personal computer and television lending ease and functionality to Web TV and home integration networks. This also allows multi-tasking with a hierarchical structure depending on the user's visual usage importance in relation to the application relevance. Although the invention has been described in relation to a television screen, as its preferred embodiment, it should be understood that the teachings of the invention could be applied to virtually any digital screen which would be sub-divided into individual sub-screens using the screen operating system described herein. The larger the screen the more viewing possibilities become available to the user. Preferably, supplying a larger screen not only increases viewing area, but more importantly offers creative & interesting choices, i.e. totally diverse interacting scenarios arbitrarily chosen.

U.S. patent application Ser. No. 10/357,565 to Catanese, entitled "Process for Dividing an electronic Screen into Discrete, Independently Operating Sub-Screens", which is incorporated herein by reference.

Figure 3:
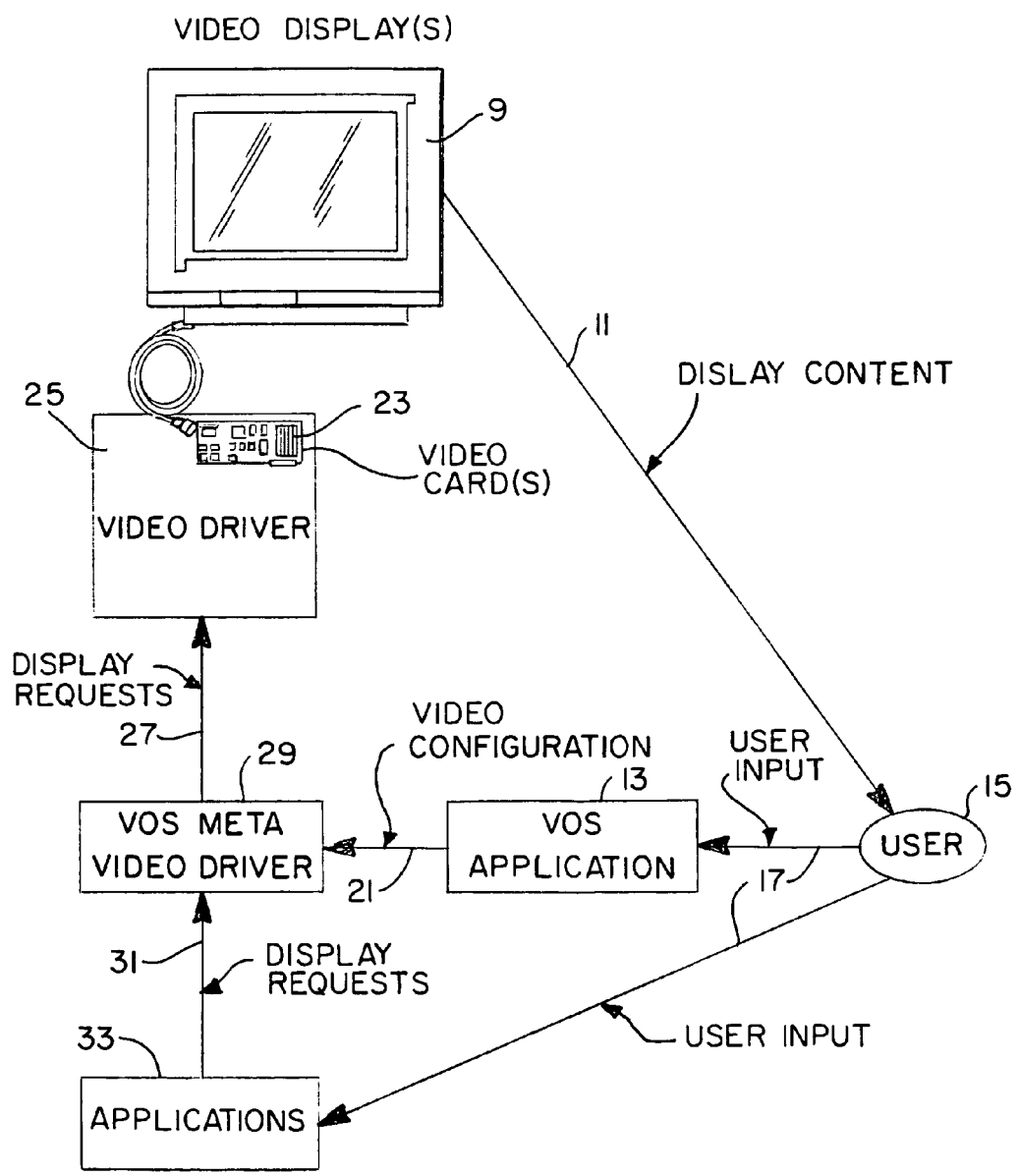
FIG. 3 is the flow diagram of the visual management system architecture.

As described in FIG. 3, the Video Display(s) component 9 is one or more video display device viewed by the user to interact with the video operating system (VOS)-enabled system. The output display 9 may take any form commonly known in the art such as, but not limited to: CRT monitors, plasma screens, organic light-emitting diodes, flexible computer displays such as e-paper, computer monitors, televisions, projection screens, and/or LCD screens. Individual sub-screens 3 may be allocated to certain video displays 9 by the user 15.

The Video Card(s) 23 component is one or more video driver hardware devices used to generate the video signal(s) for the Video Display(s). These are the hardware components of the VOS. The video card 23 utilized may also be any card commonly known in the art such as, but not limited to: Voodoo, Radeon, and GeForce.

The installation of this software can be, but not limited to: downloads via the internet, installation from media or wirelessly transferred.

The VOS Meta Video Driver 29 is a software component that accepts video Display Requests 27 from the applications 33 that want to display to the user. It takes the incoming Display Requests 27 and issues Display Requests 27 to the underlying Video Driver software 29 according to the Video Configuration 21. The Video Configuration 21 is modified by the User 15 via the VOS Configuration Application or by other means such as configuration files or other application interfaces. The VOS Meta Video Driver and the VOS Application are the software components of the VOS, however may be encoded into hardware form.

The software core component of the VOS is the Meta Video Driver 29. To applications it appears to be just another video driver, and to the underlying video drivers, it appears to be an application. In this way, the VOS Configuration Application can allow the user to seamlessly and easily interact and manipulate applications across various hardware and visual presentation configurations.

Capabilities of the VOS Configuration Application include the ability to take any video display request and reposition, rescale, adjust color, combine with other requests, etc. Additionally it has the capability to create it's own display requests and to interact with other applications. An example of this would be where a configurable icon bar is presented to the user in a VOS-controlled portion of the screen. This icon bar is used to control other applications within the primary video display. A more sophisticated implementation would allow the user to interactively select a portion of the primary display to be presented in another display. With this functionality, a user could select the news-ticker portion of a video feed from one window and display just that part of that video feed in another display.

The Applications 33 may display video inputs from various sources such as internal programs, external programs and external video sources. In this deployment, the VOS provides the capability to flexibly split and manage the available applications to provide the user with a multiple video source experience 3. Since the VOS system acts as a normal video driver for the applications, they do not need to be changed to take advantage of the advanced screen manipulation operations implemented by the VOS.

The VOS Configuration Application can also get its input from internal and external interfaces. This lets it manipulate the display according to user input from other applications, direct input from the user or from external controllers, limited only by the hardware and external software support.

The VOS may also be embodied primarily in hardware. This may be implemented by creating custom hardware components for the Video Display(s) 9 and/or the Video Card(s) 23.

In the Video Display(s) 9 custom hardware implementation, the image presented to the user 15 is be implemented by multiple video display units 9 that comprise a single visual experience to the user. For example the user may be presented with a primary video display unit (such as CRT or flat panel) with an additional smaller display unit alongside the primary one to display iconic or other information to the user.

In the Video Card(s) 23 custom hardware implementation, the VOS Meta Video Driver 29 and the Video Driver 25 components are merged. Additionally appropriate portions of the VOS Meta Video Driver 29 functionality are implemented inside the Video Card(s) 23. For example processing-intensive video operations such as scaling and screen division would be implemented by the hardware instead of the driver software, thus offloading the work from the host CPU onto the video hardware.

These Video Display(s) 9 and Video Card(s) 23 may be used together to create sophisticated visual configurations where a single Video Card 23 may be used to drive several display components together. For example, using the appropriate set of video cards and supporting hardware, a video wall of 9 flat-screen displays could be combined with a LED-array scrolling display to present an integrated visual experience to a large audience, all controlled by one VOS Application.

Figure 4:
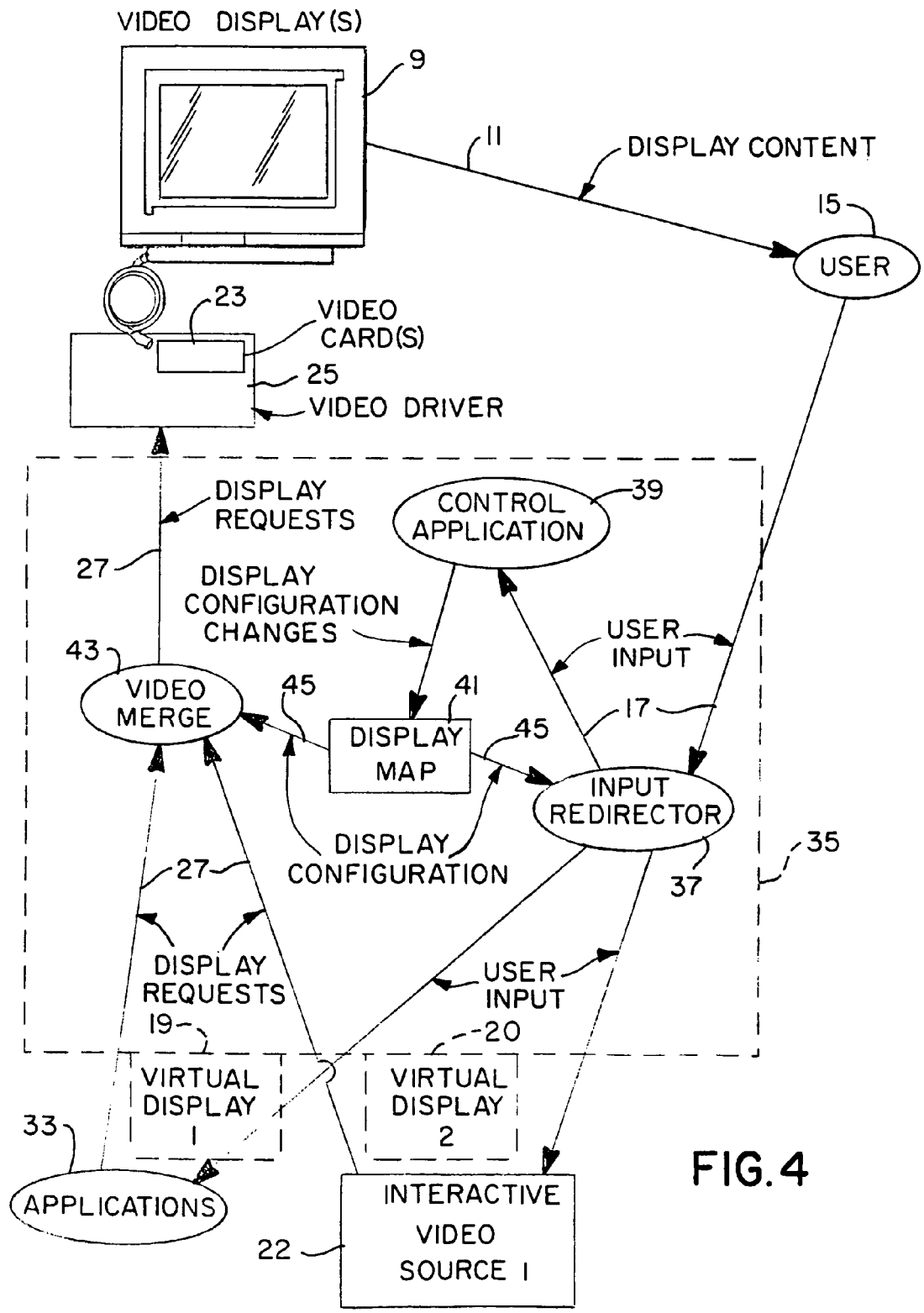
FIG. 4 is the flow diagram detailing the logical architecture.

As described in FIG. 4, the central part of the VMS architecture is the Display Map 41. The Display Map 41 is the internal representation of how video sources 22 are arranged on the video hardware. One or more Virtual Displays 19-20 are managed by the Control Application 39 inside the Display Map 41.

The Control Application 39 allows the user to manipulate the Display Map 41. It takes care of initializing the Display Map 41 at system startup, and saving it at system shutdown. It provides a user interface to the User 15 from which the user 15 can manage the display layout. It lets the user split displays and move and manipulate visual components and applications from one Virtual Display 19-20 to another.

Each application or Interactive Video Source 22 interacts with its own Virtual Display 19-20 which it considers to be its own. The Video Merge 43 uses the Display Map 41 to translate the Virtual Displays 19-20 into one set of operations sent to the video driver(s) 25. Likewise, the Input Redirector 37 takes User Input 17 and sends it to the appropriate Virtual Display 25 interface that each Application or Interactive Video Source 22 gets its input 17 from.

Figure 5:
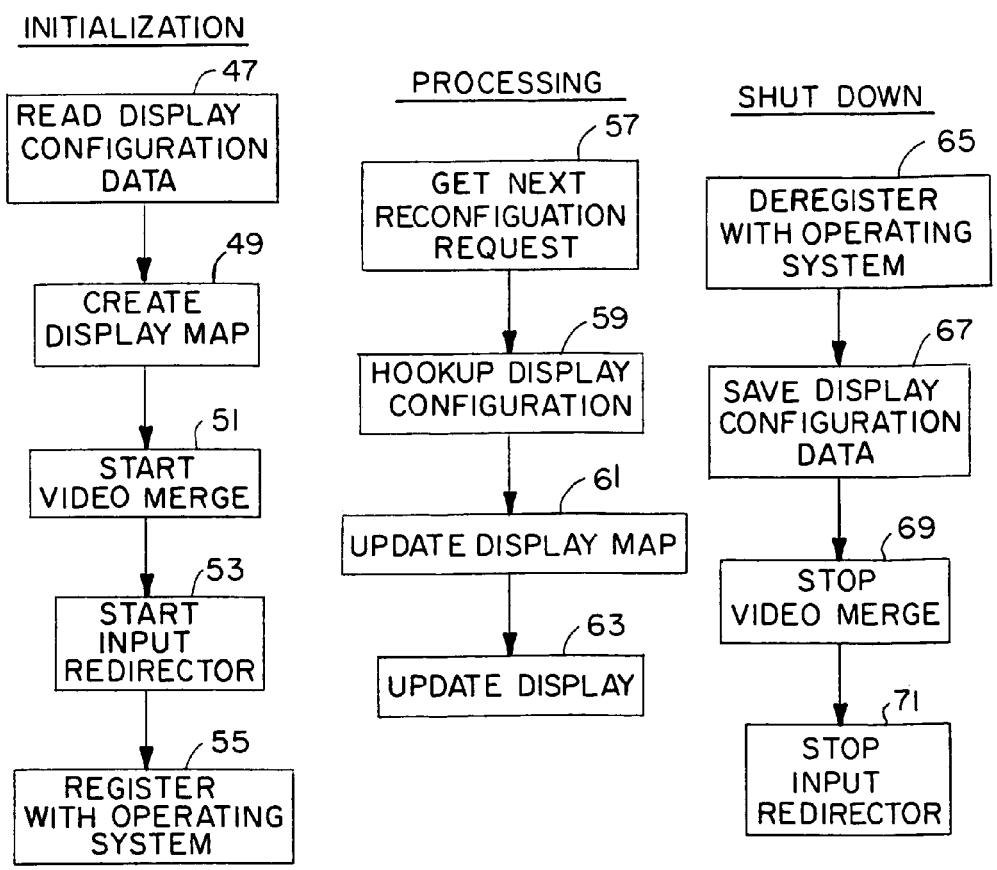
FIG. 5 is the flow diagram of the control application process.

As described in FIG. 5, the Control Application allows the user to manipulate the Display Map 44. It takes care of initializing the Display Map at system startup, and saving it at system shut down.

The Initialization process begins by reading display configuration data 47 from a file or other data source. It then creates the Display Map 49 internal data structures and starts the Video Merge 51 and Input Redirector services 53. Once internal initialization is complete, it registers with the Operating System 55 to let it know that it is ready to handle input and display requests.

Once initialized, the Control Application processes display reconfiguration requests 57 from user input 17. It does this by matching the request with the current state of the Display Map, and updating the Display Map 61 as necessary to fulfill the request. If the change to the Display Map requires a change in display 63, it updates the Video Merge process with the required changes.

At system shut down, the Control Application deregisters 65 itself from the operating system, saves the display configuration data 67 from the Display Map, and then shuts down the Video Merge 69 and Input Redirector processes 71.

Figure 6:
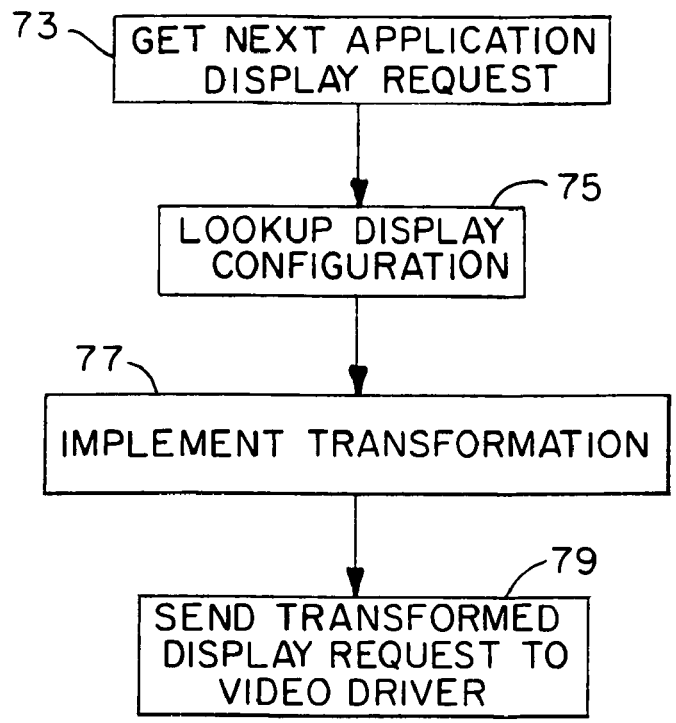
FIG. 6 is the flow diagram of the video merge process.

As described in FIG. 6, the Video Merge process takes the various Display Requests 73 from the Applications and Interactive Video Sources and translates them for display on the video hardware.

Its processing consists of first, getting each Display Request 73. It then looks up the context of the Application 75 in the Display Map to determine what transformations are required. It implements those transformations 77 on the original Display Request, which include operations such as resizing or clipping. The transformed Display Request 79 is then passed on to the Video Driver that actually displays the information. For example an application in Virtual Display A wants to display an image bounded by rectangle with X, Y coordinates of 50, 150 by 200, 250. That Virtual Display is positioned on the actual display at base coordinate with an offset of 55, 55 and a reduced scale of 50%. The transformed display result sent to the Video driver is a rectangular image composed from the original image reduced in size by 50% and bounded by coordinates of 80, 130 by 155, 180.

Figure 7:
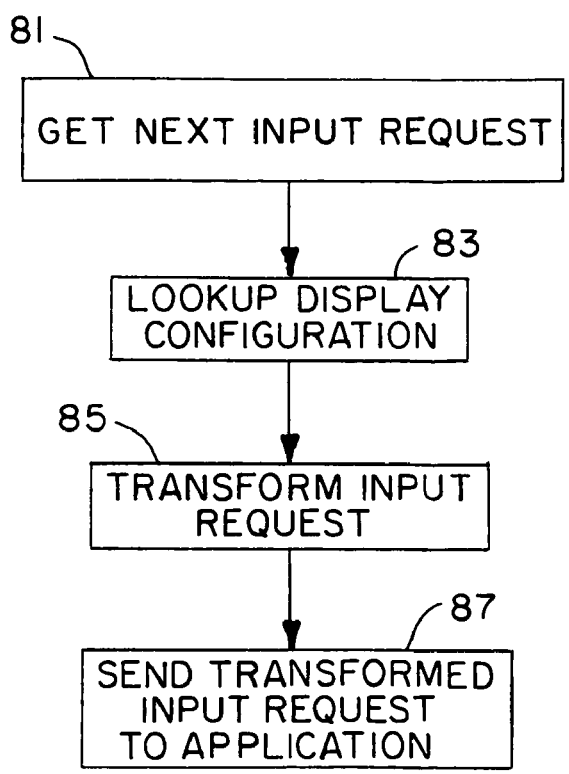
FIG. 7 is the flow diagram of the input direct process flow.
Figure 8:
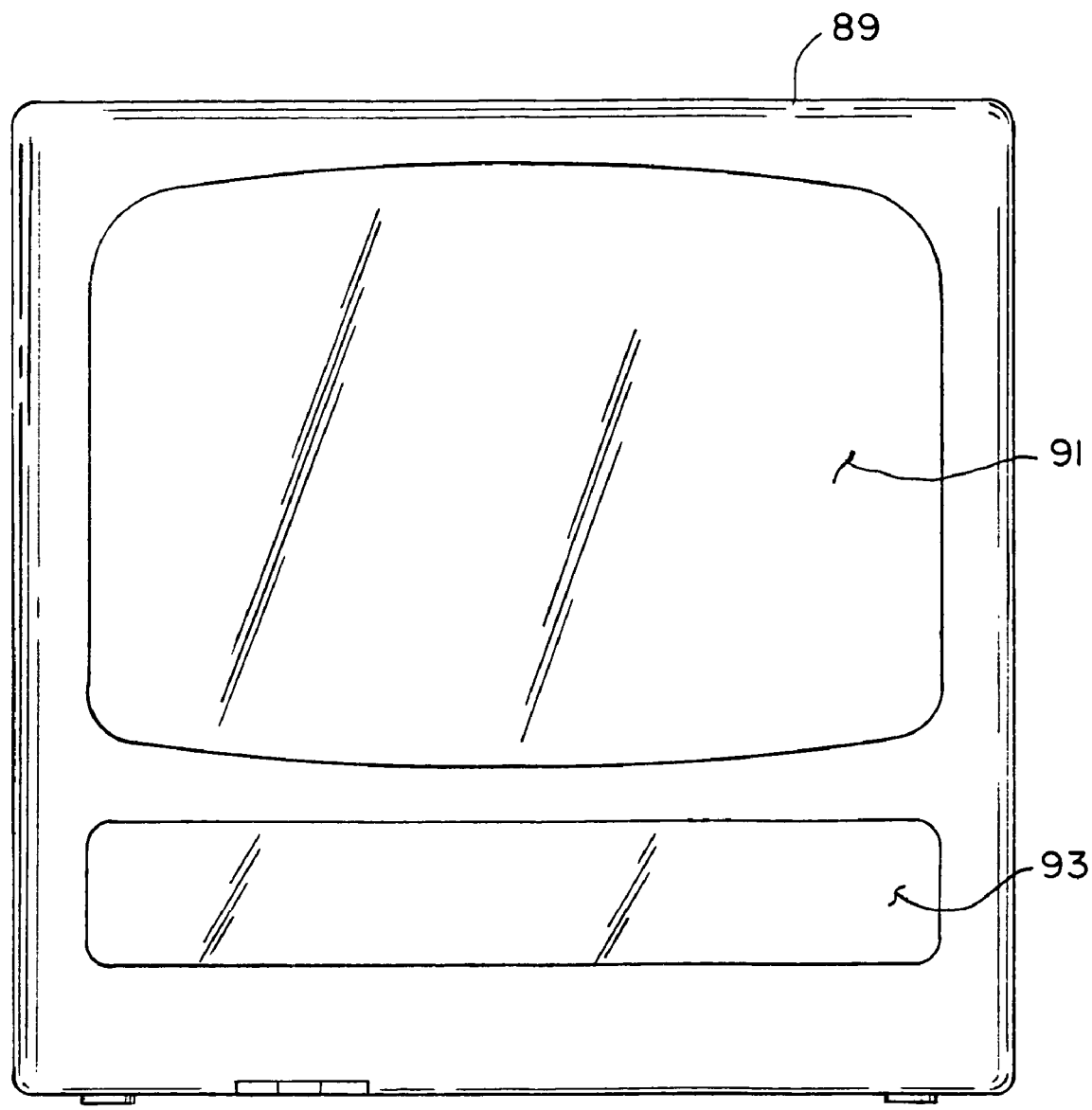
FIG. 8 is a diagrammatic view of a display screen with a partition portion for the sub-screens.
Figure 3:
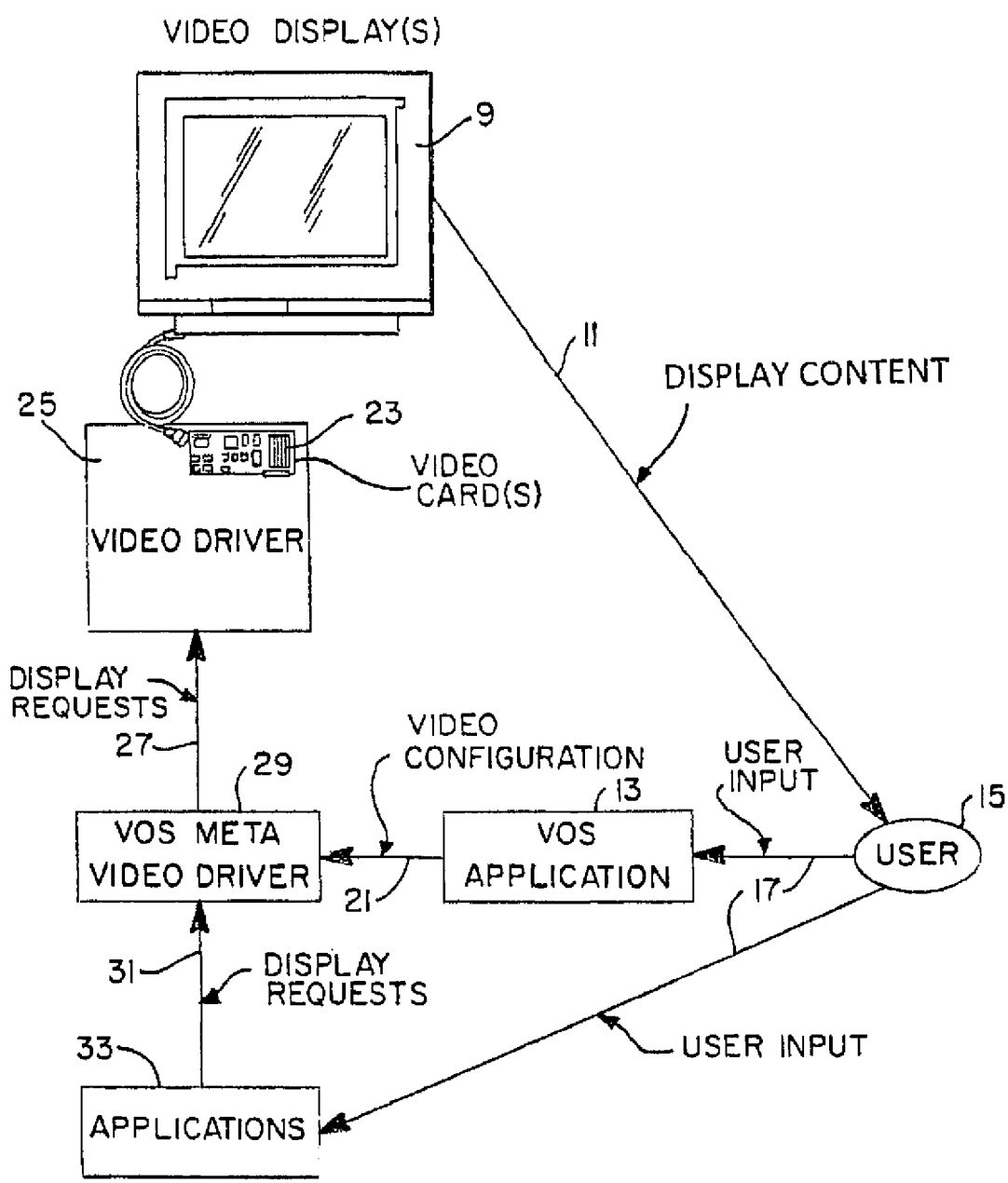

As described in FIG. 7, the Input Redirect process takes input requests 81 and sends the input requests to the appropriate Application.

The Input Redirect processing consists of first, reading the next Input Request 81 from the Operating System. It then looks up the context of the request in the Display Map 83 to determine what transformation is necessary and which Application(s) is(are) to receive the input. After the lookup, the appropriate transformation 85 is applied and the transformed request is sent to the appropriate Application 87. For example, if a mouse device is clicked at X,Y position 100, 250 and the Display Map says that Virtual Display A contains that location, but is scaled down 50%, then display A receives that mouse click at position 200, 500.

As described in FIG. 6, conventional video displays 89 may be manufactured with physical partitions 93 which can separate sub-screens 3 from the main viewing screen 91.

While the above invention has been described with reference to certain embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. The method of visual management comprising:
   starting up a plurality of software applications on a computer; said computer having a viewing display comprising a visual display screen having visual and/or audio output associated therewith;
   providing one or more video driver hardware devices to generate video signals for said video display;
   providing a meta video driver capable of accepting electronic dynamic video and/or audio display requests from said respective software applications, said meta video driver appearing as a video driver to said applications, while said meta video driver appearing as an application to underlying video drivers, thereby allowing a user to seamlessly and easily interact and manipulate applications across various hardware and visual presentation configurations;
   selecting said plurality of software applications;
   sizing said plurality of software applications into respective portioned software applications;
   arranging a sizing of said portioned software applications on a respective predetermined location on respective discrete electronic independently operating visual and/or audio output sub-screen regions of a visual display screen of said computer,
   independently feeding said visual and/or audio data from said video and/or audio display requests in an active mode simultaneously and independent from other respective discrete independently operating visual and/or audio output sub-screen regions;
   creating a plurality of data access lines for providing said visual and/or audio data comprising said dynamic video and/or audio content to said respective sub-screen regions, which said data is manipulated through discrete access lines;
   wherein the data stream of respective user selected video and/or audio content being displayed in any one of respective predetermined positions of said respective sub-screen regions does not override the data stream of video and/or audio content being displayed in any other respective sub-screen region absent express instruction to do so by a user;
   simultaneously accessing, including editing and extracting to reconfigure user-selected portions of said dynamic video and/or audio display of content in any of said respective portioned sub-screen regions being manipulated through said screen operating system, while said electronic screen remains divided into respective sub-screen regions;
   interactively selecting a video portion of the primary display and displaying just said video feed portion in another display on said sub display screen; and
   wherein each said sub-screen region actively supports respective video and/or audio data generated respectively from said video and/or audio display requests.

2. The method of visual management as in 1 further comprising: the step of fixing the position of the user selected video and/or audio content at each respective user-selected sub-screen region of said visual display screen.

3. The method of visual management as in claim 2 in which respective application positioning each of said software applications is stored at any point in time during the usage of the computer, and re-instituted after each reboot.

4. The method of visual management as in claim 2 in which user viewing of said visual and/or audio data may be done on a multiple of output devices of said computer.

5. The method of visual management as in claim 2 in which centralizing all custom sized software applications occurs within an access bar.

6. The method of visual management as in claim 2 in which displaying the access bar occurs only on certain user designated device(s).

7. The method of visual management as in claim 2 further comprising the step of allowing the user to place overlays on said visual display screen to cover portions of said viewing display.

8. The method of visual management as in claim 2 in which resizing said application's viewing display to determine the number of scroll bars necessary to scroll through respective output 9. The method of visual management as in claim 2 in which de-fining the shape of the application's viewing display is controlled by the user.

10. The method of visual management as in claim 4 in which predetermining the positions of a selected software application can be across a multiplicity of output devices of said computer.

11. The method of visual management as in claim 2 further comprising the step of placing all user selected software applications into a predetermined information bar designated for said respective software applications.

12. The method of visual management as in claim 11 in which the information bar has a scrolling effect to allow the user to view all selected software applications.

13. The method of visual management as in claim 12 in which the scrolling functionality can be controlled by the user.

14. The method of visual management as in claim 2 in which starting applications are automatically initiated amongst respective software applications selected for a customized computer interface.

15. The method of visual management as in claim 2 in which said manipulating of said software applications occurs within said predetermined positions of said respective sub-screen regions.

16. The method of visual management as in claim 15 further comprising: allocating a particular fixed view of said respective software applications.

17. The method of visual management as in claim 13 further comprising the step of viewing a portion of a respective application where real time changes can be observed by the user.

* * * * *

UNITED STATES PATENT AND TRADEMARK OFFICE
CERTIFICATE OF CORRECTION

| | | |
|---|---|---|
| PATENT NO. | : 7,844,900 B2 | Page 1 of 2 |
| APPLICATION NO. | : 10/861237 | |
| DATED | : November 30, 2010 | |
| INVENTOR(S) | : Joseph P. Catanese and Paul Delano | |

It is certified that error appears in the above-identified patent and that said Letters Patent is hereby corrected as shown below:

Drawings

In FIG. 3, the spelling of the words "DISLAY CONTENT" should be corrected to read --DISPLAY CONTENT--. (See Attached)

Specification

In column 3, line 35, the words "the Video Display(s) component 9" should be corrected to recite --the Video Displays(s) component 9 with Display Content 11--.

Signed and Sealed this
First Day of March, 2016

Michelle K. Lee
*Director of the United States Patent and Trademark Office*